United States Patent
Hussain et al.

(10) Patent No.: US 7,814,342 B2
(45) Date of Patent: Oct. 12, 2010

(54) SYSTEM AND METHOD FOR COMMUNICATION USING AN AC SIGNAL FROM A POWERED DEVICE

(75) Inventors: Asif Hussain, Tustin, CA (US); Manisha Pandya, Anaheim Hills, CA (US)

(73) Assignee: Broadcom Corporation, Irvine, CA (US)

( * ) Notice: Subject to any disclaimer, the term of this patent is extended or adjusted under 35 U.S.C. 154(b) by 718 days.

(21) Appl. No.: 11/582,371

(22) Filed: Oct. 18, 2006

(65) Prior Publication Data

US 2008/0098240 A1   Apr. 24, 2008

(51) Int. Cl.
*G06F 1/00* (2006.01)
(52) U.S. Cl. ............... 713/300; 713/310; 375/239; 375/246; 375/253
(58) Field of Classification Search ........... 713/300, 713/310; 375/29, 246, 253
See application file for complete search history.

(56) References Cited

U.S. PATENT DOCUMENTS

| | | | |
|---|---|---|---|
| 6,985,713 B2 * | 1/2006 | Lehr et al. | 455/343.5 |
| 6,986,071 B2 * | 1/2006 | Darshan et al. | 713/330 |
| 7,460,889 B2 * | 12/2008 | Darshan et al. | 455/572 |
| 7,532,017 B2 * | 5/2009 | Anderson | 324/705 |
| 7,593,756 B2 * | 9/2009 | Ferentz et al. | 455/572 |
| 7,613,939 B2 * | 11/2009 | Karam et al. | 713/300 |
| 7,724,650 B2 * | 5/2010 | Karam | 370/217 |
| 2005/0197094 A1 * | 9/2005 | Darshan et al. | 455/402 |
| 2006/0039698 A1 * | 2/2006 | Pautler et al. | 398/33 |
| 2006/0082220 A1 * | 4/2006 | Karam et al. | 307/4 |
| 2006/0168459 A1 * | 7/2006 | Dwelley et al. | 713/300 |
| 2007/0135086 A1 * | 6/2007 | Stanford | 455/402 |
| 2010/0049998 A1 * | 2/2010 | Karam et al. | 713/300 |

* cited by examiner

*Primary Examiner*—Thomas Lee
*Assistant Examiner*—Jaweed A Abbaszadeh
(74) *Attorney, Agent, or Firm*—Duane S. Kobayashi

(57) ABSTRACT

A system and method for communicating information using Layer 1 from a powered device to power source equipment via Ethernet. In one embodiment, Layer 1 information such as power management, classification, temperature, and disconnect information is transmitted from a powered device to power source equipment using an AC signal that has a cycle defining a first time period during which the AC signal is turned on and a second time period during which the AC signal is turned off. A type of information being sent by the powered device can be determined based on characteristic on/off times of the AC signal cycle.

20 Claims, 3 Drawing Sheets

SYSTEM AND METHOD FOR COMMUNICATION USING AN AC SIGNAL FROM A POWERED DEVICE

BACKGROUND

1. Field of the Invention

The present invention relates generally to power over Ethernet (PoE) systems and methods and, more particularly, to the use of a powered device (PD) originated AC signal for communication by the PD to the power source equipment (PSE).

2. Introduction

The IEEE 802.3af PoE standard provides a framework for delivery of power from power source equipment (PSE) to a powered device (PD) over Ethernet cabling. In this PoE process, a valid device detection is first performed. This detection process identifies whether or not its connected to a valid device to ensure that power is not applied to non-PoE capable devices.

After a valid PD is discovered, the PSE can optionally perform a power classification. IEEE 802.3af defines five power classes for a PD device. The completion of this power classification process enables the PSE to manage the power that is delivered to the various PDs connected to the PSE. If a particular power class is identified for a particular PD, then the PSE can allocate the appropriate power for that PD.

Once the power is connected to the device, the PSE uses either AC or DC Disconnect method to find out whether or not the device is still connected. In the DC disconnect method, the PSE detects that the PD load current has dropped down to a certain value to conclude that the device has been disconnected. In the AC disconnect method, the PD disconnect is examined by the AC impedance of the PD by the PSE, which is accomplished by sending an AC probing signal. Monitoring the occurrence of a disconnect condition is crucial to ensuring that power delivery is also discontinued over that Ethernet line.

As this PD connection and disconnection process illustrates, the detection of a condition of a PD is crucial. In general, this reflects the importance of the PSE being aware of an operating condition of PDs. In conventional systems, a PSE's visibility into the state or condition of operation of a connected PD is through the measurement of a PD's response to probing signals transmitted by a PSE. This layer 1 communication process is limited in its capacity to communicate information between the PD and the PSE. What is needed therefore is a mechanism that enables the direct communication of information from the PD to the PSE.

SUMMARY

A system and/or method for communication using an AC signal from a powered device, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

As noted, once the PSE supplies power to the PD after detection and classification phases, the PSE monitors whether the PD is still connected. The monitoring can be performed using the AC disconnect method, where the PSE examines the AC impedance of the PD. The AC disconnect method is based on the fact that the open circuit impedance at the PSE port is significantly higher than when the same port is terminated by a valid PD. Thus, if a high impedance is measured by the PSE, then the PD is no longer connected and the port must be turned off.

Figure 1:
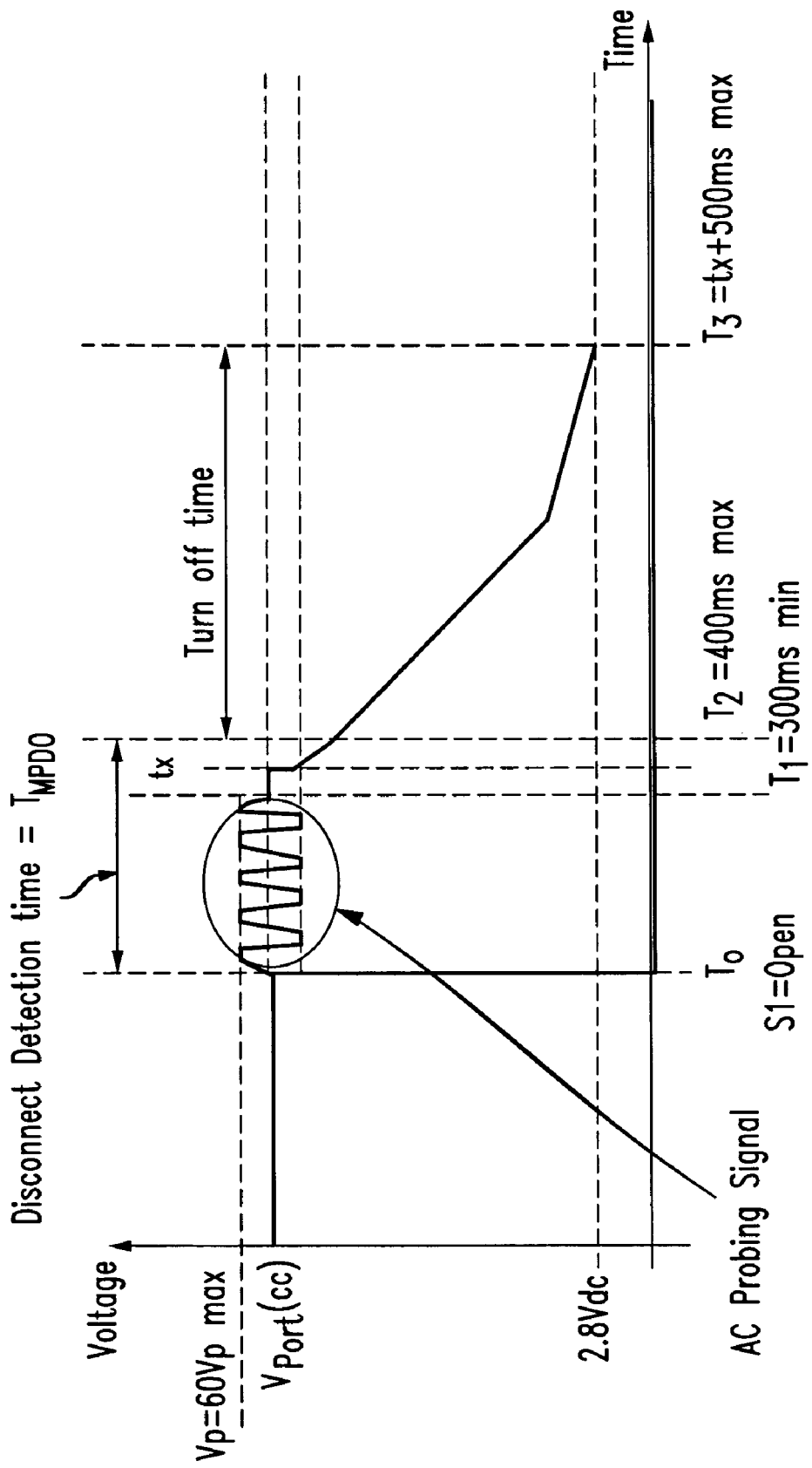
FIG. 1 illustrates an AC probing signal that is sent by a PSE.

This examination is enabled by the PSE's sending of an AC probing signal to the PD. FIG. 1 illustrates an example of an AC probing signal that is transmitted by the PSE to the PD. As illustrated, the AC probing signal has a small AC voltage that is similar to power supply ripple voltage and load ripple current. This small AC voltage is superimposed on the power ($V_{port}$) that is applied to the port. In the 802.3af PoE standard, the AC probing signal is specified as a low frequency signal that is less than 500 Hz.

After the PSE applies the small AC voltage to the power applied to the port, the PSE can then measure the returned AC signal amplitude at the port terminal. Under normal operation, the connected PD's relatively low impedance returns a low AC signal. The detected low impedance of the PD (e.g., less than 27 k$\Omega$) will enable the PSE to determine that the PD is still connected.

If the PD is disconnected, on the other hand, then the open circuit would cause the PSE to detect high impedance (e.g., greater than 2 M$\Omega$). Upon this high impedance detection, the PSE will then shut off power to the port until a later valid signature and classification is identified.

As illustrated in FIG. 1, the AC probing signal is turned on for a duration of a time period $T_1$ that lasts approximately 300 ms. The application of such an AC probing signal on the port will enable the PSE to detect a PD disconnection within a time period ($T_{MPDO}$) of 400 ms. Detection of a PD disconnection will enable the PSE to turn off the power on the port within a time period of 500 ms.

As the AC disconnection method illustrates, communication between the PSE and PD is typically limited to the identification of a response to a probing signal. This also holds true for the detection and classification processes that are implemented by the PSE. In general, layer 1 communication between the PSE and PD is limited in its capacity to convey information.

It is therefore a feature of the present invention that more advanced forms of layer 1 communication can be enabled between the PSE and PD through the use of AC signals. These AC signals that are sent by the PD can be similar to the AC probing signals that are sent by the PSE, and can be generated, for example, by known current modulation techniques.

As will become apparent from the following description, a protocol using the AC signals can be established that enables a signaling of a type of information being conveyed. This signaling of the type of information being conveyed defines a context for interpretation of the particular message that is being communicated. With this signaling protocol, advanced forms of detection and configuration can be performed by the PSE, including, but not limited to, power management, classification, and disconnection. As would be appreciated by one of ordinary skill in the relevant art, the principles of the present invention are not limited by the type of information that is being conveyed.

Figure 2:
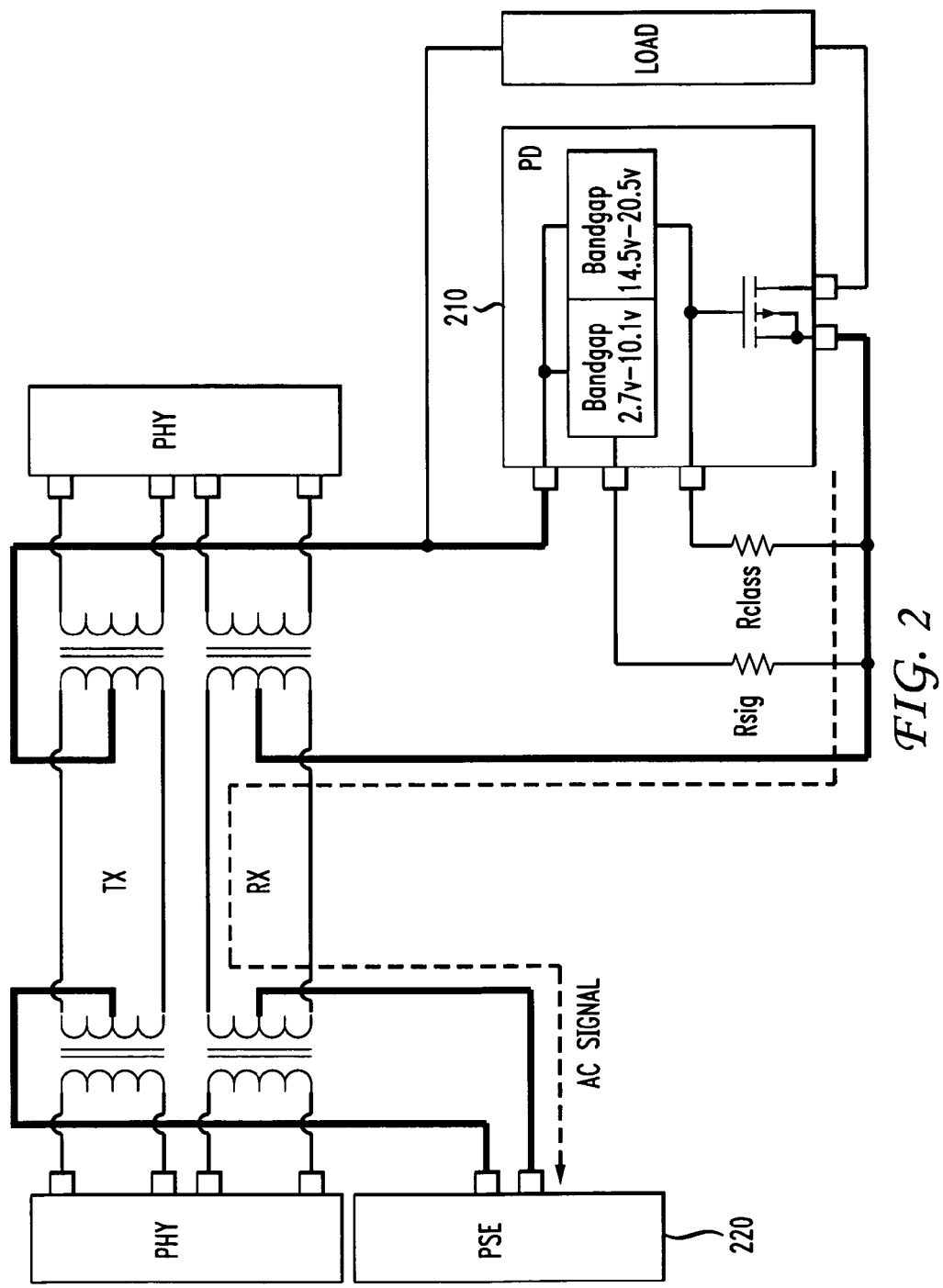
FIG. 2 illustrates an embodiment of a PD communication mechanism.

In accordance with the present invention, the signaling protocol is included in AC signals that are transmitted by the PD to the PSE. FIG. 2 illustrates such a transmission, wherein PD 210 transmits an AC signal to PSE 220. Here, it should be noted that the AC signal transmission from PD 210 to PSE 220 is opposite the direction of transmission of conventional AC probing signals by a PSE during an AC disconnection detection process.

To clarify this distinction, it should be recognized that AC probing signals during the AC disconnection process did not communicate information in and of themselves. Rather, the AC probing signals were used by a PSE to incite a signal response on the port. The measurement of such a signal response on the port was used by the PSE to determine the desired connection/disconnection information.

In contrast, the AC signals of the present invention that are transmitted by PD 210 contain information in and of themselves. Communication between PD 210 and PSE 220 is therefore based on the extraction of the information contained within the AC signals transmitted by PD 210.

In one embodiment, the AC signals that are transmitted by PD 210 are similar to the AC probing signals transmitted by a PSE during a disconnection detection process. In that regard, the AC signals can have similar amplitudes and frequencies as the AC probing signals. This should not be viewed as a limitation, however. Rather, the choice of AC signals that are similar to AC probing signals provide implementation benefits since AC probing signals have already been approved for use in existing PoE applications. Thus, the use of AC signals that are similar to AC probing signals provide an easier path to adoption, but does not preclude the use of other AC signal amplitudes and frequencies to accomplish the same purposes as part of a signaling protocol.

Figure 3:
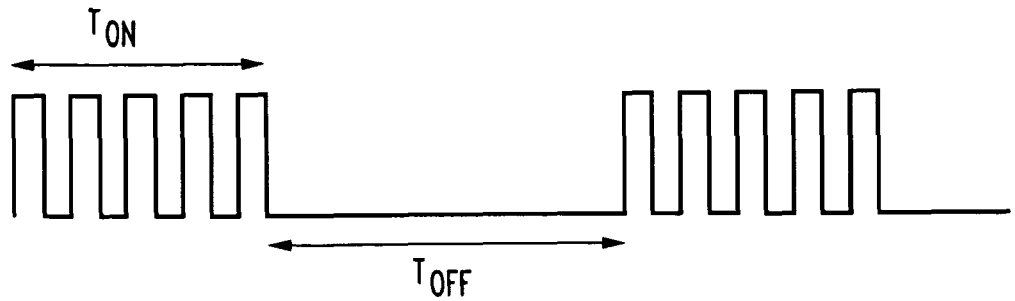
FIG. 3 illustrates an example of an AC signal that is sent from a PD to a PSE.

FIG. 3 illustrates an example of an AC signal that can be transmitted by PD 210 to PSE 220. As illustrated, the AC signal includes a first time period ($T_{ON}$) during which the AC signal is turned on, and a second time period ($T_{OFF}$) during which the AC signal is turned off. The number of cycles for the time period $T_{ON}$ can vary between implementations. In one example, the time period $T_{ON}$ can have 10 cycles. Together, the time period $T_{ON}$ and the time period $T_{OFF}$ represent a single on/off cycle of the AC signal. During the on portion of the cycle, the AC signal is active with a given current amplitude and frequency. As noted above, this frequency can correspond to the frequency of AC probing signals that are sent by a PSE during the disconnect detection phase.

It is a feature of the present invention that the length of the time periods $T_{ON}$ and $T_{OFF}$, either alone or in combination, can be used to communicate information from the PD to the PSE. In other words, the detection by PSE 220 of an active time period $T_{ON}$ and/or an inactive time period $T_{OFF}$ of an AC signal on a port can represent information communicated to PSE 220 by PD 210. In effect, this form of communication can be described as time modulation of the on and/or off portions of the AC signal cycle.

Consider, for example, a communication system wherein three different time periods $T_{ON}$ such as 100 ms, 200 ms, and 300 ms can be used by PD 210 to correspond to a value A, B, and C, respectively. In this framework, detection by PSE 210 of an AC signal having a time period $T_{ON}$ of approximately 200 ms, would then be interpreted by PSE 210 of receipt of information having value B.

As would be appreciated, the defined granularity of the time modulation of the on and/or off portions of the AC signal would be implementation dependent. The limits of such a defined granularity would be determined by the transmission and detection capabilities of the PD and PSE.

Figure 4:
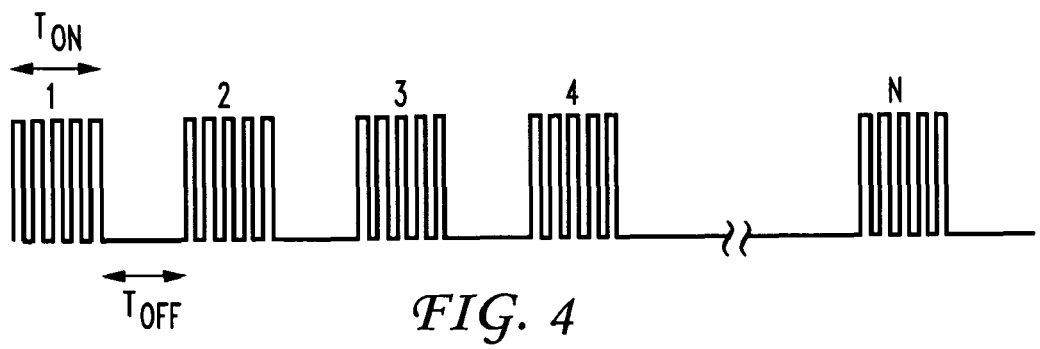
FIG. 4 illustrates an example of a message communicated using AC signals.

To illustrate an example of such a time modulation mechanism in the context of a PoE application, consider the AC signal example of FIG. 4. As illustrated, the AC signal cycle again includes an active time period $T_{ON}$ and an inactive time period $T_{OFF}$. In one communication scheme, the length of the active time period $T_{ON}$ and/or the inactive time period $T_{OFF}$ can be used to identify whether the information sent by PD 210 to PSE 220 relates to connection/disconnection, classification, power management, temperature, etc. In a simple example, the connection/disconnection information type can be identified by an active time period $T_{ON}$ of 100 ms and an inactive time period $T_{OFF}$ of 300 ms, the classification information type can be identified by an active time period $T_{ON}$ of 100 ms and an inactive time period $T_{OFF}$ of 200 ms, and the power management information type can be identified by an active time period $T_{ON}$ of 100 ms and an inactive time period $T_{OFF}$ of 100 ms. In this framework, the three different information types would be distinguishable by PSE 210 by identifying the length of only the inactive time period $T_{OFF}$. As noted, in an alternative embodiment, the three information types could be distinguished by identifying the length of only the active time period $T_{ON}$, or identifying the length of the active time period $T_{ON}$ and the inactive time period $T_{OFF}$.

Once the type of information being communicated is identified, PSE 210 can then determine the specific information of the identified type that is being transmitted. In one embodiment, the specific information being transmitted can be identified by the number (N) of repeating on/off cycles of the AC signal. FIG. 4 illustrates the transmission of N AC signal cycles, wherein each of the N AC signal cycles has the same on/off cycle.

At the receiving end, PSE 210 would be operative to detect the number (N) of received on/off AC signal cycles. For example, for the classification information type wherein an AC signal cycle is represented by an active time period $T_{ON}$ of 100 ms and an inactive time period $T_{OFF}$ of 200 ms, the detected number N of AC signal cycles can correspond to the class type of PD 210. For the power management information type, wherein an AC signal cycle is represented by an active time period $T_{ON}$ of 100 ms and an inactive time period $T_{OFF}$ of 100 ms, the detected number N of AC signal cycles can correspond to a particular power management message that is being communicated. For example, message 2 identified by 2 detected AC signal cycles can be used to communicate a particular error condition at the PD. Finally, for the connection/disconnection information type, wherein an AC signal cycle is represented by an active time period $T_{ON}$ of 100 ms and an inactive time period $T_{OFF}$ of 300 ms, the detection of an AC signal cycle can be used as a type of heartbeat signal. Here, the continual receipt of such an AC signal cycle would inform the PSE that the PD is still connected and receiving power supplied over Ethernet.

Figure 5:
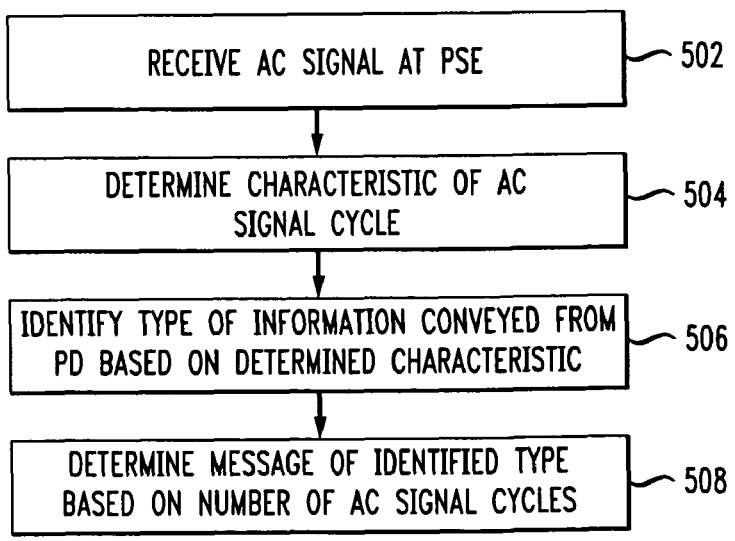
FIG. 5 illustrates a flowchart of a process by which AC signal cycles are used to communicate information to the PSE.

To summarize, FIG. 5 illustrates a flowchart of a process by which AC signal cycles are used to communicate information to the PSE. As illustrated, the process begins at step 502, where the PSE receives an AC signal from the PD. At step 504, the PSE then determines a characteristic of the AC signal cycle. In various embodiments, this determined characteristic can be one or both of the active time period $T_{ON}$ and the inactive time period $T_{OFF}$ of the AC signal cycle.

Next, at step 506, the PSE would identify a type of information conveyed from the PD based on the determined characteristic. For example, different types of information such as connection/disconnection, classification, power management, temperature, etc. can be distinguished based on the length of the active time period $T_{ON}$, the length of the inactive time period $T_{OFF}$, or the combination of the active time period $T_{ON}$ and the inactive time period $T_{OFF}$. Once the type of information is identified, the PSE would then determine, at step 508, the number (N) of AC signal cycles that are received. This number (N) of received AC signal cycles would then be correlated to a particular message of the determined communication type. For example, the number of AC signal cycles can correspond to the class of the PD.

It should be noted that a particular communication application may have no need to distinguish between different types of information. This could result, for example, due to the limited amount of information that would need to be communicated from the PD to the PSE. In this case, a single type could be used, wherein the number (N) of AC signal cycles would be sufficient to identify all potential messages.

As the description above illustrates, the AC signal cycles that are transmitted by the PD can be used to communicate various types of information directly to the PSE. The potential applications of such a communication mechanism should not be limited by the examples illustrated above. Rather, the communication mechanism of the present invention can be used to communicate any status, operation, administration, maintenance, or signaling information from the PD to the PSE. As such, the communication principles can also be used to support direct layer 1 communication from the PSE to the PD.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A device powered over Ethernet, comprising:
    a signature detection component that enables detection of the powered device by power source equipment;
    a power controller that controls a delivery of power received from said power source equipment over Ethernet; and
    a transmitter that transmits an AC signal to said power source equipment over Ethernet, wherein said AC signal has a cycle defined by a combination of a first time period during which said AC signal is turned on and a second time period during which said AC signal is turned off, said AC signal identifying a type of information being communicated by said device based on a relative length of said cycle of said AC signal.

2. The system of claim 1, wherein said AC signal has a frequency of less than 500 Hz.

3. The system of claim 1, wherein said type of information is identified by a length of said first time period.

4. The system of claim 1, wherein said type of information is identified by a length of said second time period.

5. The system of claim 1, wherein said type of information is identified by a length of said first time period and a length of said second time period.

6. The system of claim 1, wherein said type of information is one of power management, classification, and disconnection information.

7. The system of claim 1, wherein a message of said type of information is determined by a number of cycles of said AC signal that are transmitted.

8. The system of claim 1, wherein said transmitter uses current modulation.

9. A power over Ethernet method, comprising:
    receiving, at a power source equipment, an AC signal from a powered device;
    determining a length of a cycle of said AC signal during which said AC signal is turned on for a first time period and turned off for a second time period;
    identifying a type of information that is being conveyed by said powered device based on said determined length of said AC signal cycle; and
    after said identification of said type of information, determining a message of said identified information type based on a number of cycles of said AC signal that are received.

10. The method of claim 9, wherein said receiving comprises receiving an AC signal having a frequency less than 500 Hz.

11. The method of claim 9, wherein said identifying comprises identifying a type of information based on an on time of said AC signal cycle.

12. The method of claim 9, wherein said identifying comprises identifying a type of information based on an off time of said AC signal cycle.

13. The method of claim 9, wherein said identifying comprises identifying a type of information based on an on time and an off time of said AC signal cycle.

14. The method of claim 9, wherein said type of information is one of power management, classification, and disconnection information.

15. The method of claim 9, wherein said determining comprises determining a message of said identified information type based on receipt of a number of cycles of said AC signal.

16. Power source equipment for delivering power over Ethernet, comprising:
    a power controller that controls delivery of power to a powered device coupled to the power source equipment over Ethernet;
    a receiver that receives an AC signal from said powered device over Ethernet, said AC signal having a cycle defined by a combination of a first time period during which said AC signal is turned on and a second time period during which said AC signal is turned off; and
    a processor that identifies a type of information being communicated by said powered device based on a relative length of said cycle of said received AC signal.

17. The system of claim 16, wherein said type of information is identified by a length of said first time period.

18. The system of claim 16, wherein said type of information is identified by a length of said second time period.

19. The system of claim 16, wherein said type of information is identified by a length of said first time period and a length of said second time period.

20. The system of claim 16, wherein said type of information is one of power management, classification, and disconnection information.

* * * * *